United States Patent

[11] 3,616,914

| [72] | Inventor | James S. Reid |
| | | Hudson, Ohio |
| [21] | Appl. No. | 849,356 |
| [22] | Filed | Aug. 12, 1969 |
| [45] | Patented | Nov. 2, 1971 |
| [73] | Assignee | The Standard Products Company |
| | | Cleveland, Ohio |

[54] SELF-CLEANING FILTER SYSTEM
12 Claims, 14 Drawing Figs.
[52] U.S. Cl. .................................................. 210/107,
210/143, 210/152, 210/251, 210/355
[51] Int. Cl. ..................................................... B01d 29/38
[50] Field of Search .......................................... 210/107,
143, 148, 355, 152, 251

[56] References Cited
UNITED STATES PATENTS

| 2,188,643 | 1/1940 | Laderer | 210/355 |
| 2,440,384 | 4/1948 | Schenke | 210/355 X |
| 2,858,939 | 11/1950 | Corliss | 210/152 X |

FOREIGN PATENTS

| 1,137,367 | 5/1957 | France | 210/353 |

Primary Examiner—John Adee
Attorney—Meyer, Tilberry & Body

ABSTRACT: A self-cleaning filtering system for a mobile waste disposal system in which the filter has cleaning blades which are automatically actuated to clean accumulated solids from the surfaces of the filter. The cleaning action may be actuated either by the motion of the vehicle or by movement of the liquid into, out of or within the waste tank.

INVENTOR.
JAMES S. REID
BY Meyer, Tilberry & Body
ATTORNEYS

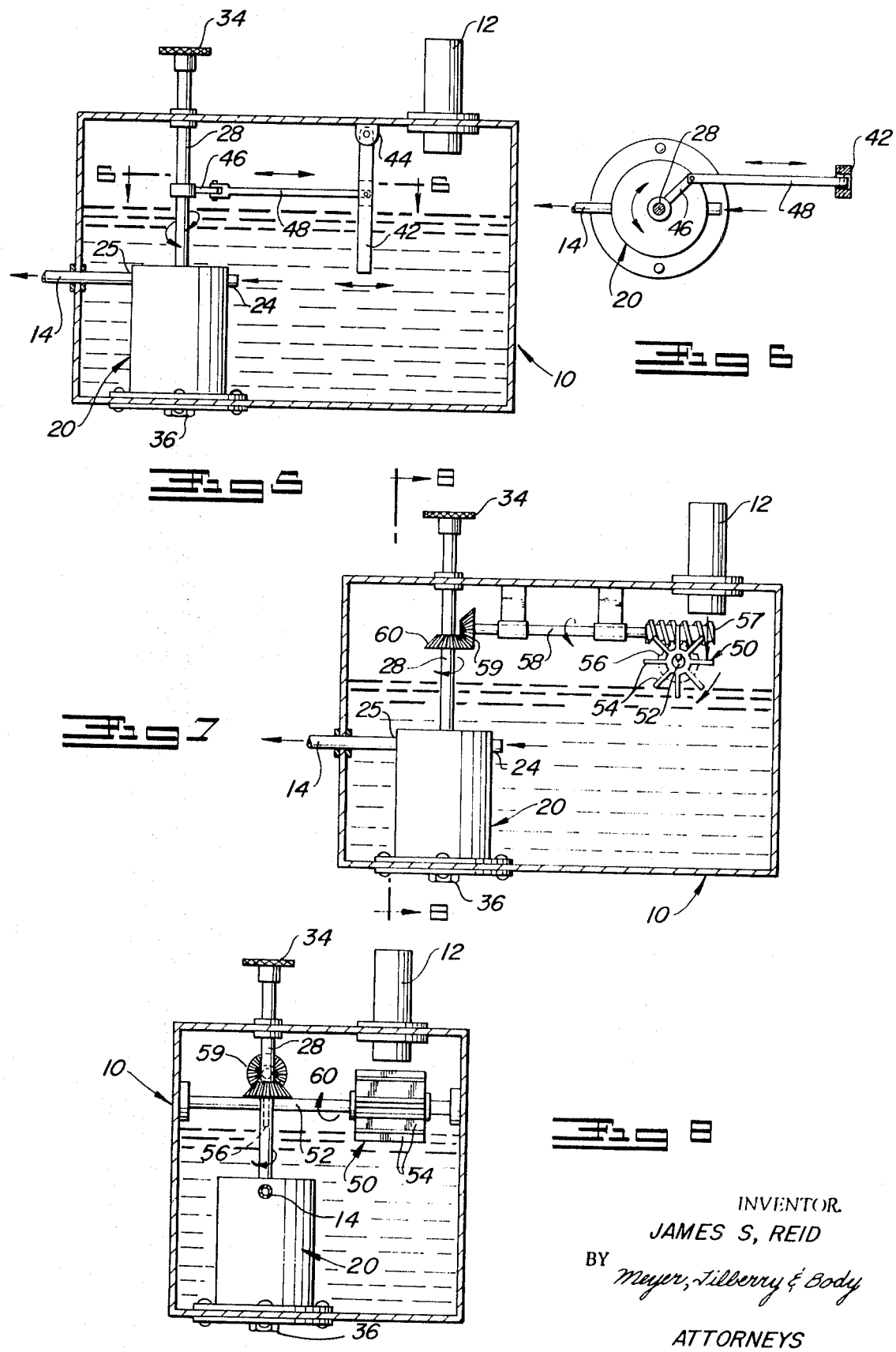

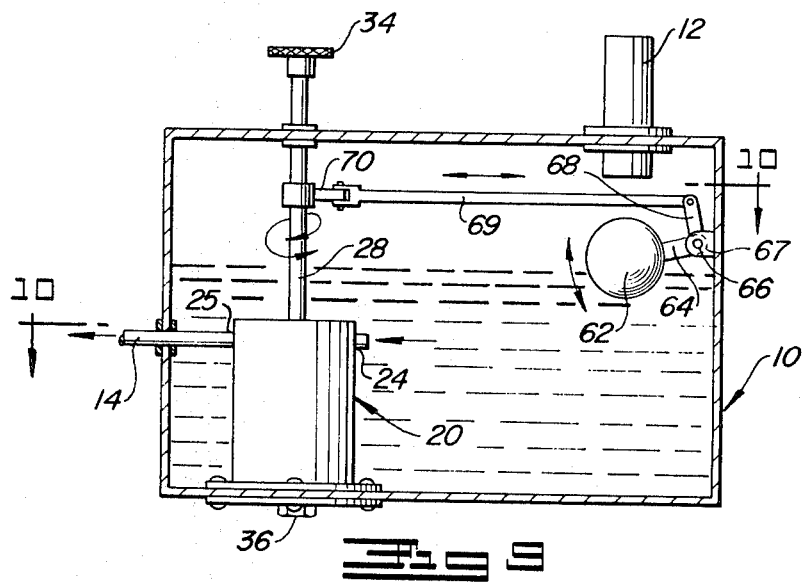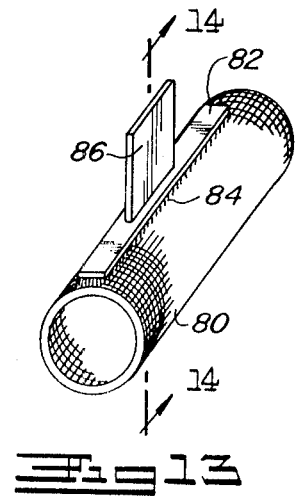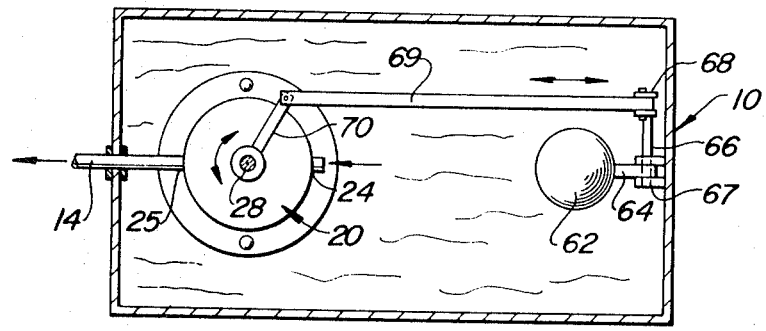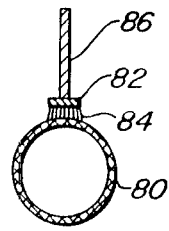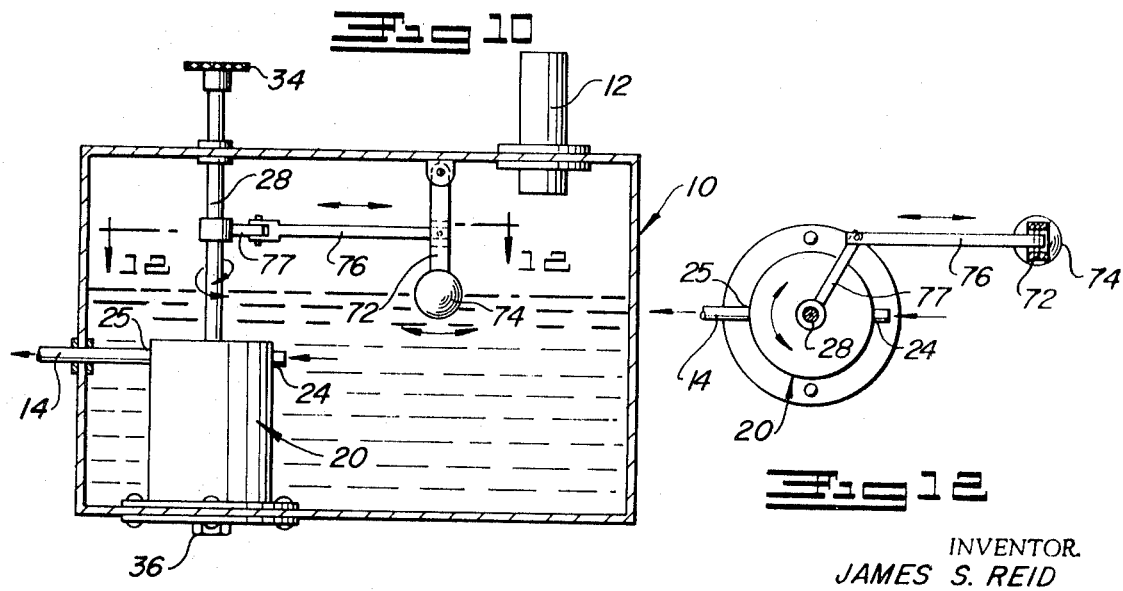

SELF-CLEANING FILTER SYSTEM

This invention relates to an improved filtering system for filtering liquids and, more particularly, to a self-cleaning filtering system.

Although not limited thereto, the invention will be described with reference to a waste disposal system of the type adapted to be employed in mobile vehicular units such as buses, trucks, house trailers, mobile homes, marine craft and various other similar classes of vehicles. In particular, the invention has specific utility as a filter through which liquids may be withdrawn from a tank or other receptacle in which waste products are deposited. However, it will be appreciated that the invention has broader application and may be employed in any environment in which liquid is to be withdrawn from a receptacle containing both liquids and solids.

There is disclosed in my prior U.S. Pat. No., 3,342,337, a waste disposal system which is particularly applicable for use in vehicles such as mobile homes. That system includes a conventional septic tank into which waste products are discharged and in which, in conventional manner, the solid waste products are attacked by bacterialogical action, either anerobic or aerobic, to reduce the solids to a partially purified solution. As contemplated by that system, the fluid solution in the septic tank subsequently is withdrawn from the tank and transmitted to a boiler unit which employs the waste-heated gases of the vehicle engine to vaporize the liquid, thereby purifying it before discharging it to the atmosphere.

As is well known, a time interval is required before the solid waste products in a septic tank are reduced to a partially purified fluid solution. During this time interval, some of the solid waste products settle to the bottom of the tank and form a sludge while other parts of the solids which are lighter than water float to the surface and contribute to forming a thick layer of grease and scum. In addition, some of the solids are in the form of particles suspended in the fluid.

As disclosed in the above-mentioned patent, there is a filter element connected to the outlet of the septic tank with this filter element functioning to assure than only the liquid and not the solids are withdrawn from the septic tank and transmitted to the boiler unit. However, it is readily apparent that with suspended particles in the fluid together with the grease, scum and sludge normally present in such tanks, there is always the possibility that the filter surfaces may become clogged or otherwise coated with solids thereby inhibiting or precluding the passage of liquid through the filter and out of the tank. The probability of such a condition occuring in mobile waste disposal systems used in vehicular units always present since the motion of the vehicle prevents the contents of the tank from settling into well-defined layers. Rather, the vehicular motion causes the liquid to slosh around in the tank thereby stirring up the solid particles and enhancing the possibility that the filter will be clogged with solids.

The prior art has recognized that, in withdrawing liquids from a container having both liquids and solids, some means of keeping the filter clean must be employed. To that end, various types of self-cleaning filters have been developed. One such filter that accomplishes this purpose and which is widely used is the Cuno filter which comprises a plurality of stacked filter leaves or discs which permit the passage of liquids therethrough but retain the solids. This filter further employs a rod which extends through a plurality of scraping or cleaning discs or blades which alternate with the filter discs whereby the rotation of the rod causes the blades to scrape the solids from the surfaces of the filter discs.

This type of self-cleaning filter, as well as other similar types of filters which employ some form of a scraper to remove the solids from the filter surfaces, are entirely satisfactory from the standpoint of filtering the liquids from the solids. However, all of these prior art filters do require some means for actuating the cleaning action. With the Cuno filter, this may be done either by manual rotation of the rod or the rod may be rotated by a motor. However, manual operation of self-cleaning filters is not at all practical in a waste disposal system which depends on operation of a vehicular unit of disposing of the waste products since the operator of the vehicle is occupied with the operation of the vehicle and can not be concerned with keeping the filter clean. Actuating the filter by a motor or similar device would be satisfactory but does involve added cost for the system.

Accordingly, it is an object of this invention to provide a self-cleaning filter for a waste disposal system in which the cleaning action of the filter occurs automatically either while the vehicle is in motion or during operation of the system.

More specifically, the principle object of this invention is to provide a self-cleaning filter for a waste disposal system in which the cleaning action of the filter is actuated by the movement of the liquid into, out or or within the waste tank or by the motion of the vehicle itself.

In accordance with the present invention, an improved filter system for use in withdrawing liquid from a septic tank or other waste-receiving receptacle or tank is provided in which the filter employs conventional scraper blades to scrape accumulated solids from the surfaces of the filter but in which the operating rod for the scraper blades is connected to means, preferably in the tank itself, which are responsive to the movement of the vehicular unit or the movement of the liquid in the tank acting on the means to actuate the rod and, hence, the scraper blades to effect the cleaning action.

Referring now to the drawings wherein like reference numerals indicate like parts in the various views:

FIG. 5 illustrates a modified form of the actuating means for the filter.

FIG. 6 is a sectional view along line 6—6 of FIG. 5.

FIG. 7 illustrates a further modified form of the invention.

FIG. 8 is a sectional view along line 8—8 of FIG. 7.

FIG. 9 illustrates another modified form of the invention.

FIG. 10 is a sectional view along line 10—10 of FIG. 9.

FIG. 11 illustrates another modified form of the invention.

FIG. 12 is a sectional view along line 12—12 of FIG. 11.

FIG. 13 is a schematic perspective view illustrating a further modified form of the invention.

FIG. 14 is a sectional view along line 14—14 of FIG. 13.

Figure 1:
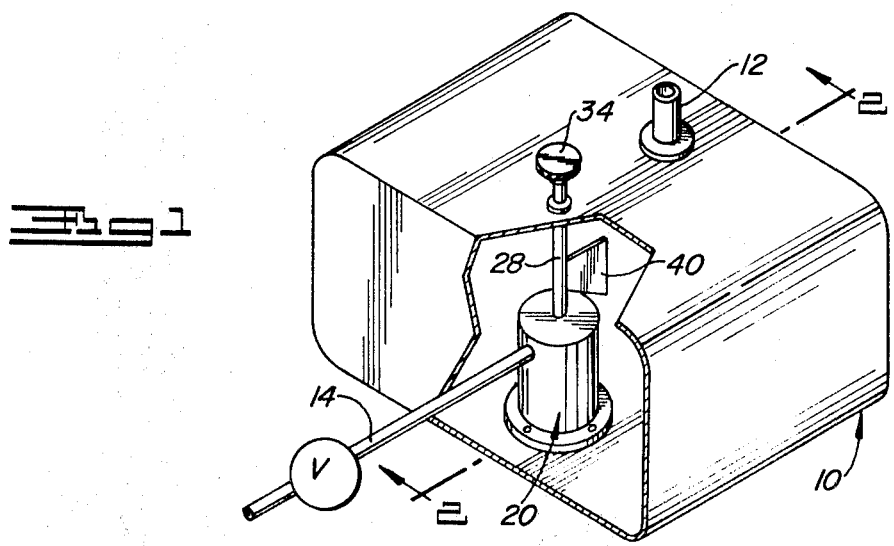
FIG. 1 is a perspective view, partly in section, showing a waste tank employing the improved filter system of the instant invention.

Referring now to FIG. 1, there is illustrated a waste-receiving receptacle or tank indicated generally by the reference numeral 10. This tank preferably is designed such that it is compatible for use in various types of vehicular units such as house trailers, buses, boats and aircraft and provides a receptacle into which waste products may be deposited for bacterialogical treatment prior to final disposal of the waste materials. It is contemplated that the waste materials will be introduced into the tank through a conduit 12 and liquid will be withdrawn from the tank through an outlet conduit 14. The liquid waste materials withdrawn from the tank 10 may be disposed of in any suitable manner such as that disclosed in my prior U.S. Pat. No. 3,342,337 to which reference may be had for a complete description.

Figure 3:
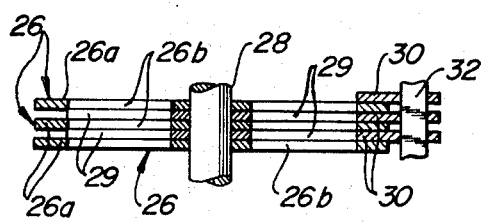
FIG. 3 is a sectional view of a portion of the filter elements.
Figure 4:
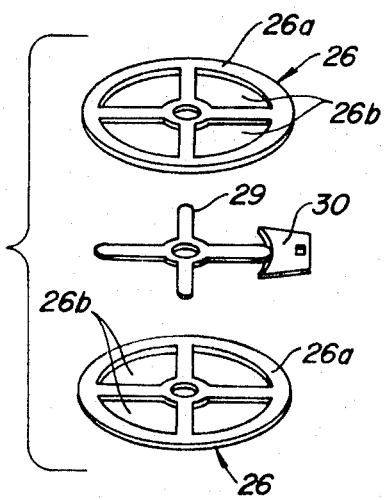
FIG. 4 is an exploded view showing the assembly of the filter elements.
Figure 2:
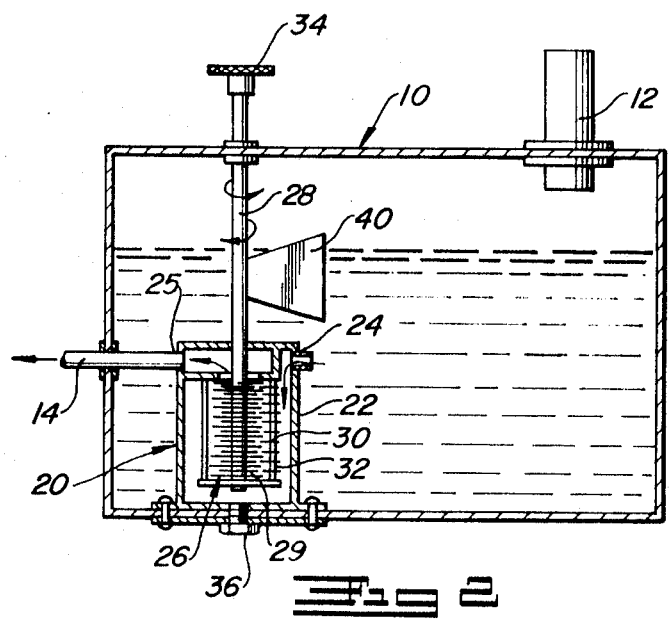
FIG. 2 is a sectional view along line 2—2 of FIG. 1.

It is contemplated that a filter element, indicated generally by the reference numeral 20, will be employed in the waste tank 10 to assure that only liquid waste products are withdrawn from the tank. This filter element may be of various configurations and types. However, one suitable type of filter is the so called Cuno filter, the construction of which is well known in the art. To facilitate and understanding of this invention, there is schematically illustrated in FIGS. 2, 3 and 4 one form of a Cuno filter which comprises a housing 22 having an inlet 24 and an outlet 25. Appropriate partitions within the housing separate the inlet from the outlet. Received within the housing 22 are a plurality of stacked filter discs 26 which are received over a shaft 28. The discs include a filter rim 26a and filter openings 26b. Each of the discs 26 is separated by a spacer 29 which, in the type of construction illustrated in FIG. 4, generally conforms to the shape of the discs 26 but does not have the peripheral filtering rim or edge 26a. As is well known, it is the thickness of the spacer which determines the degree of filtration that is achieved by the filter unit.

The discs 26 and spacers 29 are secured for rotation to the rod 28. Adjacent to the outer periphery of the spacers 29 are a plurality of stacked cleanings blades 30 which are fixed to and carried by a stationary rod 32 that is generally parallel to the rod 28. As is well known, rotation of the rod 28 causes relative movement between the filter discs 26 and spacers 29, on the one hand, and the filter blades 30 on the other, with the cleaning blades 30 cleaning out any accumulated solid particles that have accumulated along the peripherial edges of the filter discs 26. It is conventional to rotate the rod 28 either by a handle 34 or by an electric motor. A drainplug 36 is provided in the bottom of the housing so that, periodically, the accumulated solids and sludge in the filter may be removed.

As pointed out above, the construction of the Cuno filter is conventional and this construction does not, in itself, constitute, any part of the invention. The disclosed filter merely illustrates one form of commercially available filter in which cleaning or scraping blades are employed to move accumulated solids from a filter surface and it is not intended that the disclosed invention is in any way restricted to use with the specific filter disclosed.

In accordance with the principals of this invention, it is contemplated that the actuation of the rod 28 will be achieved by automatic means which are dependent on either the motion of the vehicle or movement of the liquid in the tank 10. Thus, referring to FIG. 2, there is illustrated an arrangement which is responsive to the movement of the liquid in the tank thereby automatically to actuate rotation of the rod 28 and, hence, the cleaning action of the cleaning blades 30. More specifically, there is secured to the rod 28 a vane or paddle 40 which projects radially outward from the rod 28. It is contemplated that the vane 40 will be partially immersed in the liquid in the tank 10 so that as the liquid in the tank is displaced whether by the deceleration, acceleration or other movement of the vehicle, the moving liquid will act against the surface of the vane 40 to impart a rotative motion to the rod 28. Although only one vane is illustrated in FIG. 2, it is to be understood that a plurality of such vanes might be employed either spaced circumferentially about the rod 28 or both circumferentially and longitudinally so as to accommodate various levels of liquid in the chamber.

Other forms of devices might be employed for using the motion of the liquid in the tank as a means for actuation the rod 28. For example, there is illustrated in FIG. 5 a vane or paddle 42 which is pivotally supported at 44 to the upper wall of the tank 10 with the length of the vane 42 being such that it extends into the liquid normally present in the tank. A lever 46 is secured to the rod 28 for rotation therewith with one end of the lever 46 being connected to one end of a link 48. The other end of the link is connected to the vane 42. It will be apparent that, with this construction, the movement of the liquid in the tank will act against the surface of the vane 42 thereby causing the vane to swing about its pivot axis thereby imparting a longitudinally reciprocating movement to the link 48 which, in turn, causes the rod 28 to rotate. It should be noted that with the arrangement of FIG. 5, it is possible to position vane 42 sufficiently close to the inlet conduit 12 so that as the waste products are introduced into the tank 10, the splashing caused by the entry of the waste into the tank will create some wave actions in the liquid which will be translated, through the swinging motion of the vane, into rotation of the rod 28.

There is illustrated in FIG. 7 a further modified form of the invention in which introduction of the wastes into the tank are used directly as a means for actuating the cleaning action of the filter. Thus, a paddle wheel 50 is secured to a shaft 52 rotatably carried within the tank 10. The paddle wheel has a plurality of paddles or vanes 54 with the paddle wheels being positioned in the tank 10 such that waste materials introduced through the conduit 12 will impinge on the surfaces of the vanes or paddles 54 thereby imparting rotation to the paddle wheel. This rotation of the wheel may be transferred in any appropriate manner to the rod 28. One such approach is illustrated in FIGS. 7 and 8 and comprises a gear 56 secured to the shaft 52. The gear 56 cooperates with a worm gear 57 on a shaft 58 with the other end of the shaft 58 carrying a bevel gear 59 which cooperates with a bevel gear 60 on the shaft 28.

A further modification is illustrated in FIGS. 9 and 10 and employs the movement of the liquid into, out of and within the tank as the means for actuating the rod 28. Thus, a float 62 is carried by a float arm 64 which in turn is secured to a shaft 66 rotatably carried by suitable supports 67 within the tank 10. The shaft 66 further includes a bifurcated lever 68 which is pivotally connected to one end of a link 69. The other end of the link 69 is pivotally connected to a lever 70 secured to the rod 28. With this arrangement it will be apparent that as the float 62 pivots about the axis of the shaft 66, the shaft 66 is rotated and the lever 68 is oscillated causing a corresponding oscillation to be imparted to the lever 70 and the rod 28.

The pivoting action of the float 62 may occur under any number of different conditions. For example, if the float 62 is placed in a tank adjacent the inlet conduit 12, the introduction of waste products through the inlet conduit will create some wave action which will act to cause pivoting of the float 62 and, hence, the float is to some degree responsive to the movement of liquid into the tank 10. Moreover, the float may be so positioned as to be directly in the path of waste products as they are introduced through conduit 12, in which event the float would also be caused to pivot as materials enter the tank. In addition, the float 62 will also be sensitive to the sloshing of the liquid within the tank with the float rising and falling as the liquid is displaced within the tank. Moreover, as liquid is withdrawn from the tank, the float 62 will move downward with the level of the liquid, thereby causing further rotation of the rod 28. Thus the float is responsive to movement of the liquid out of the tank 10.

It is apparent from the foregoing embodiments that each is responsive to the movement of the liquid within the tank 10 whether it is movement into the tank, out of the tank or within the tank or some combination of these movements. It is also apparent that each of the foregoing means for rotating the rod 28 is automatic in that either as the vehicle is operated or as the waste disposal system is operated, so also the cleaning action of the filter is operated.

There is illustrated in FIGS. 11 and 12 a further modification which, although it may be disposed within the tank 10, its operation is independent of any movement of the liquid in the system. Rather, this modification employs the motion of the vehicle as the means for actuating the rod 28. Thus, a pendulum 72 having a weight 74 at the end of the pendulum arm is pivotally secured to the upper wall of the tank 10. It will be apparent that the pendulum will be displayed with any swaying motion of the vehicular unit in which the waste disposal system is employed with the swinging movement of the pendulum 72 being transmitted to the rod 28 in substantially the same manner as the embodiment of FIG. 5. Thus, a link 76 is pivotally connected at one end of the pendulum arm while the other end of the link is connected to a lever 77 carried by the rod 28. Swinging movement of the pendulum 72 causes longitudinal reciprocation of the link 76 which, in turn, imparts rotation to the rod 28 thereby initiating the cleaning action of the cleaning blades 30.

It will be apparent that the foregoing principles may be applied to filters other than Cuno filters. For example, there is illustrated in FIG. 13 a simple filter screen 80 which is well known in the art. Associated with the screen 80 is a cleaner 82 which may be a scraper but which, as illustrated, is a brush having bristles 84 in engagement with screen 80. The brush may be supported in any of a number of ways, the important feature of the support being only that the brush is free to oscillate relative to screen 80, thus permitting the bristles 84 to brush away any collected particles on screen 80. Oscillation of the brush may be accomplished by any of the foregoing means, the mode illustrated in FIG. 13 being that of a vane 86 which is impacted by the moving liquid in the manner described above to displace the brush 82.

Having thus described my invention, I claim:

1. An improved waste disposal system including a tank for receiving waste products, which products may include both liquid and solid materials; an opening in said tank through which the waste products are introduced and an outlet in said tank through which the liquid may be withdrawn; and filter means in communication with said tank and associated with said outlet to permit the passage of liquid through said outlet while restraining the passage of solids; cleaning means associated with said filter means for removing solids from the surface of said filter means through relative movement between said filter means and said cleaning means; the improvement comprising: actuating means for initiating the relative movement between said filter means and said cleaning means, said actuating means being responsive to the movement of the vehicle, said actuating means comprising a pendulum supported for swinging motion, and means interconnecting said pendulum with one of said filter means and said cleaning means whereby swinging motion of said pendulum causes relative movement between filter means and said cleaning means.

2. In a human conveyance having a waste disposal system including a waste tank for receiving liquid and solid waste material, said tank having an inlet for introducing said waste material into said tank and an outlet for discharging said waste material from said tank, filter means positioned for filtering solids from said waste material as said waste material is discharged from said tank through said outlet, said filter means including filter surface structure means for trapping solid waste material thereon, said filter means including filter cleaning structure means for removing solid waste material from said filter surface structure means, at least one of said structure means being movable relative to the other of said structure means, the improvement comprising; actuating means responsive to movement of said conveyance for moving said one movable structure means, said actuating means including a movable mass supported for movement relative to said conveyance, connecting means connecting said mass with said one movable structure means for moving said one movable structure means in response to movement of said mass.

3. In a human conveyance having a waste disposal system including a waste tank for receiving liquid and solid waste material, said tank having an inlet for introducing said waste material into said tank and an outlet for discharging said waste material from said tank, filter means positioned for filtering solids from said waste material as said waste material is discharged from said tank through said outlet, said filter means including filter surface structure means for trapping solid waste material thereon, said filter means including filter cleaning structure means for removing solid waste material from said filter surface structure means, at least one of said structure means being movable relative to the other of said structure means, said filter cleaning structure means including wiper means contacting said filter surface structure means for positively wiping solid waste material therefrom during movement of said one movable structure means, the improvement comprising; movable actuating means positioned in said waste tank for moving said one movable structure means, said actuating means being positioned in contact with said waste material in said waste tank and being movable wit variations in the surface level of said waste material in said waste tank to operate said one movable structure means.

4. In a human conveyance having a waste disposal system including a waste tank for receiving liquid and solid waste material, said tank having an inlet for introducing said waste material into said tank and an outlet for discharging said waste material from said tank, filter means positioned for filtering solids from said waste material as said waste material is discharged from said tank through said outlet, said filter means including filter surface structure means for trapping solid waste material thereon, said filter means including filter-cleaning structure means for removing solid waste material form said filter surface structure means, at least one of said structure means being movable relative to the other of said structure means, actuating means connected with said movable structure means and extending exteriorly of said filter means for moving said one movable structure means to remove solid waste material from said filter surface means, the improvement comprising; said actuating means including a movable actuating device positioned within said waste tank for contact with said waste material in said waste tank, said actuating device being acted upon by movement of said waste material in said waste tank to operate said actuating means and more said one structure means.

5. The device of claim 4 wherein said actuating device is positioned adjacent said inlet to said waste tank for direct contact by waste material flowing into said waste tank through said inlet.

6. The device of claim 5 wherein said actuating device comprises movable vane means acted upon by force of waste material flowing through said inlet and striking thereagainst.

7. The device of claim 4 wherein said actuating device comprises movable vane means responsive to surging movement of waster material in said waste tank to operate said actuating means.

8. The device of claim 4 wherein said actuating device comprises a movable float mechanically connected with said one structure means for moving said one structure means responsive to variations in the amount of said waste material in said waste tank.

9. The device of claim 4 wherein said actuating means includes an elongated rotatable rod connected with said one structure means and said actuating device is connected with said rod for rotating said rod when said actuating device is acted upon by force of movement of said waste material in said waste tank.

10. The device of claim 9 wherein said actuating device comprises movable vane means.

11. The device of claim 9 wherein said actuating device is positioned adjacent said inlet to said tank for direct contact by waste material flowing onto said tank through said inlet.

12. The device of claim 9 wherein said actuating device comprises a float.

* * * * *